(12) United States Patent
Habin et al.

(10) Patent No.: US 7,326,036 B1
(45) Date of Patent: Feb. 5, 2008

(54) HELICOPTER ROTOR TRANSMISSION ASSEMBLY

(76) Inventors: Brandon M. Habin, P.O. Box 223, Jefferson, MA (US) 01522; Henry A. Rettstadt, P.O. Box 229, Princeton, MA (US) 01543

( * ) Notice: Subject to any disclaimer, the term of this patent is extended or adjusted under 35 U.S.C. 154(b) by 322 days.

(21) Appl. No.: 11/115,909

(22) Filed: Apr. 27, 2005

Related U.S. Application Data (60) Provisional application No. 60/566,328, filed on Apr. 29, 2004.

(51) Int. Cl.
*F01D 7/00* (2006.01)

(52) U.S. Cl. .................... 416/148; 416/170 R (58) Field of Classification Search ........... 416/134 A, 416/148, 170 R, 174; 244/17.11, 17.25
See application file for complete search history.

(56) References Cited

U.S. PATENT DOCUMENTS

| | | | |
|---|---|---|---|
| 3,072,197 A * | 1/1963 | Stahmer .................. 416/121 |
| 3,941,502 A * | 3/1976 | Jackson .................. 416/83 |
| 4,208,889 A * | 6/1980 | Peterson ................ 464/138 |
| 4,473,335 A | 9/1984 | Henry | |
| 4,477,225 A * | 10/1984 | Burkam ................ 416/134 A |
| 6,607,357 B2 | 8/2003 | Caramaschi | |
| 6,695,254 B2 | 2/2004 | Zoppitelli | |

\* cited by examiner

*Primary Examiner*—Edward K. Look
*Assistant Examiner*—Devin Hanan
(74) *Attorney, Agent, or Firm*—Brian M. Dingman; Mirick, O'Connell, DeMallie & Lougee (57) ABSTRACT

A helicopter rotor transmission assembly for translating motion of a drive shaft driven by a helicopter engine into rotary motion of a helicopter rotor mast that carries rotor blades. The transmission assembly includes a fixed outer housing, an inner housing carried within the outer housing and adapted to rotate relative to the outer housing by the drive shaft, and a ball received in the inner housing so as to be rotatable relative to the inner housing about one axis, and constrained from rotation about the two orthogonal axes. The ball is adapted to receive the rotor mast so that the mast can be driven to both spin and tilt.

13 Claims, 7 Drawing Sheets

HELICOPTER ROTOR TRANSMISSION ASSEMBLY

CROSS REFERENCE TO RELATED APPLICATION

This application claims priority of Provisional application Ser. No. 60/566,328, filed on Apr. 29, 2004.

FIELD OF THE INVENTION

This invention relates to a transmission that drives a helicopter rotor mast.

BACKGROUND OF THE INVENTION

In order to control helicopters, it is necessary to be able to control the angle of attack of the main rotor blades. In most helicopters, this adjustability is provided by a swash plate assembly. The angle of the swash plate is changed through control rods that are moved by the pilot's input to the cyclic and collective controls. The swash plate assembly is a complex mechanical assembly that undergoes tremendous stress at very high speed and is thus subject to severe maintenance requirements. There is thus a need for alternative means of controlling the rotor blade attack angle without the use of a swash plate assembly.

SUMMARY OF THE INVENTION

This invention is a transmission that is effective to both transfer power from the engine drive shaft to rotate the rotor mast as well as control the angle of attack of the rotor blades.

This invention features a helicopter rotor transmission assembly for translating motion of a drive shaft driven by a helicopter engine into rotary motion of a helicopter rotor mast that carries rotor blades. The inventive transmission assembly comprises a fixed outer housing, an inner housing carried within the outer housing and adapted to rotate relative to the outer housing by the drive shaft, and a ball received in the inner housing so as to be rotatable relative to the inner housing about one axis, and constrained from rotation about the two orthogonal axes, wherein the ball is adapted to receive the rotor mast so that the mast can be driven to both spin and tilt.

The ball may be rotatable relative to the inner housing about an axis that is orthogonal to the rotor mast longitudinal axis and passes through the center of the ball. The ball may be adapted to rotate up to about plus or minus 30°. The ball may define a pair of diametrically opposed vertically-oriented slots in its surface, and the transmission may further comprise two ball bearings located between the inner housing and the ball, one riding in each slot, to constrain motion of the ball relative to the inner housing. The slots may have a width that is essentially equal to the diameter of the ball bearings.

The helicopter rotor transmission may still further include a support assembly engaged with the mast and supported by the helicopter structure that decouples some of the weight of the mast and rotor blades from the ball. The support assembly may comprise at least one mechanical member through which the mast passes and on which the mast rests. The support assembly may still further comprise a partially spherical member coupled to the mast and received in a ball seat coupled to the mechanical member. The mechanical member may be adapted to move side-to-side relative to the ball, to accommodate tilting of the mast. The support assembly may further comprise a second mechanical member. One mechanical member is preferably located above the ball, and the other is then located below the ball.

The transmission may further include one or more tapered roller bearings between the inner and outer housings to allow for the relative rotational motion. The mast may be coupled to the ball by a spline. The helicopter rotor transmission may further comprise a gear assembly in part coupled to the inner housing and in part coupled to the drive shaft, for translating drive shaft rotation to inner housing rotation.

Also featured is a helicopter rotor transmission assembly for translating motion of a drive shaft driven by a helicopter engine into rotary motion of a helicopter rotor mast that carries rotor blades. This embodiment comprises a fixed outer housing, an inner housing carried within the outer housing and adapted to rotate relative to the outer housing by the drive shaft, and a ball received in the inner housing so as to be rotatable relative to the inner housing about one axis, and constrained from rotation about the two orthogonal axes, wherein the ball is adapted to receive the rotor mast so that the mast can be driven to both spin and tilt, and wherein the ball defines a pair of diametrically opposed vertically-oriented slots in its surface. There are two ball bearings located between the inner housing and the ball, one riding in each slot, to constrain motion of the ball relative to the inner housing. A support assembly engaged with the mast decouples some of the weight of the mast and rotor blades from the ball. The support assembly comprises at least one mechanical member through which the mast passes and on which the mast rests.

BRIEF DESCRIPTION OF THE DRAWINGS

Other objects, features and advantages will occur to those skilled in the art from the following description of the preferred embodiment, and the accompanying drawings, in which:

FIG. 4A is a more detailed view of a portion of the assembly of FIG. 2 showing the upper sliding plate and the ball, with FIGS. 4B and 4C showing the ball in more detail;

DETAILED DESCRIPTION OF THE PREFERRED EMBODIMENT

Figure 1:
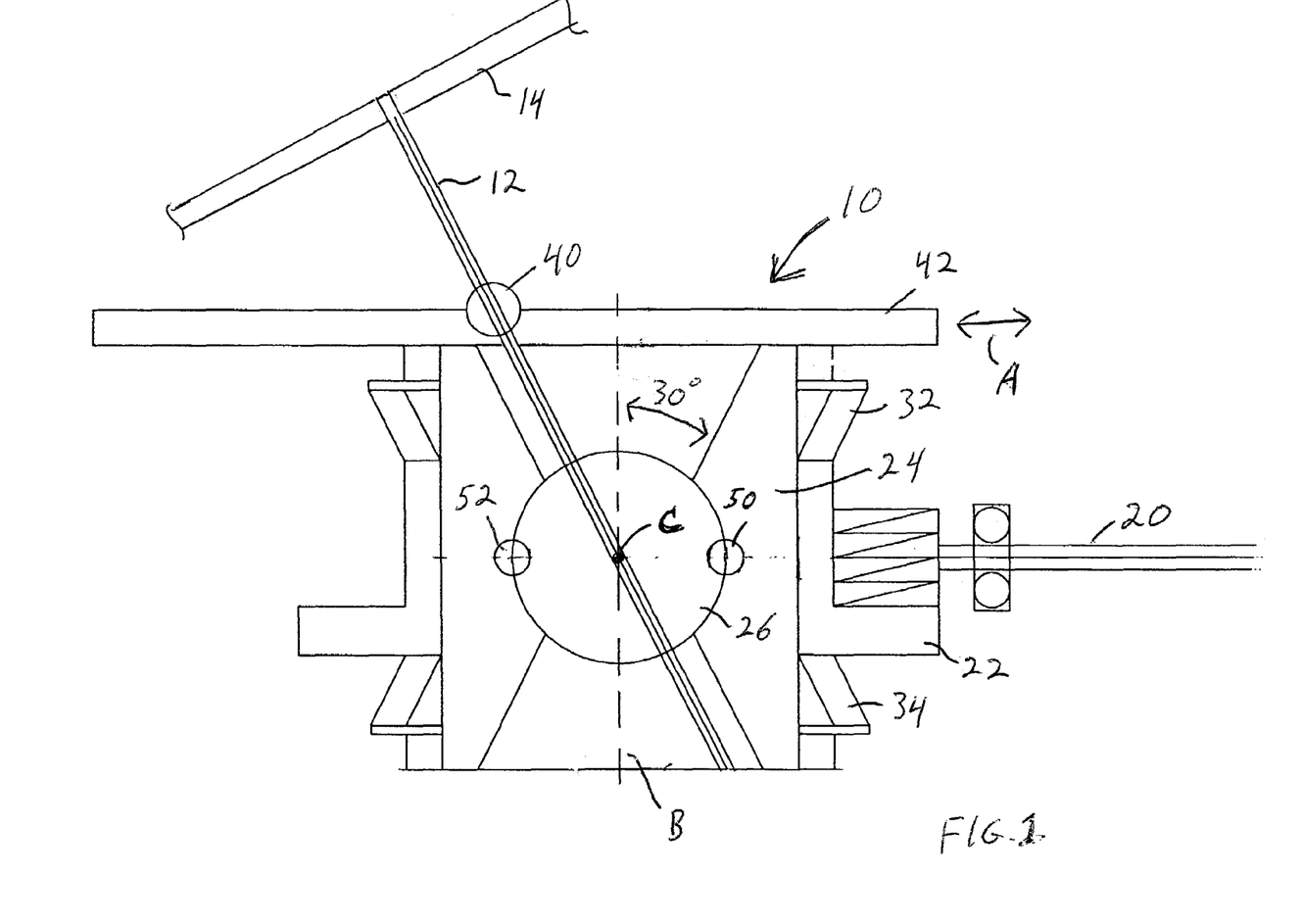
FIG. 1 is a schematic diagram of the preferred embodiment of the helicopter rotor transmission assembly of the invention.

FIG. 1 is a conceptual diagram of the preferred embodiment of the invention. Helicopter rotor transmission assembly 10 according to the invention is adapted to translate motion of helicopter engine drive shaft 20 into rotary motion of rotor mast 12 having rotor blades 14 on its distal end. Transmission assembly 10 also allows tilting of rotor mast 12. When the rotor mast is so tilted, the angle of attack of the rotor blades is changed. The rotor mast could be controlled for example by articulation through pneumatic or hydraulic stepper motors connected to the lower support plate. Additionally, the pitch of the blades can be uniformly altered for example through a stepper motor and gear system connected to the rotor mast. The entire rotor mast assembly can be controlled by an automated or human interface.

These motions of rotor mast 12 are accomplished through a ball joint comprising ball 26 that is adapted to tilt a certain amount (30 degrees in the preferred embodiment) about the two axes axis that are orthogonal to the longitudinal axis of rotor mast 12, where the orthogonal axes pass through center C of ball 26. One of these orthogonal axes would be in and out of the page in FIG. 1. Ball 26 is constrained from rotational movement relative to inner housing 24 along the longitudinal axis of rotor mast 12. This arrangement is accomplished in the preferred embodiment by including in the surface of ball 26 a pair of diametrically opposed, vertically-oriented slots shown in detail below, with one each of ball bearings 50 and 52 located in each slot. The slots have a width that is essentially the same as the diameter of balls 50 and 52. Ball bearings 50 and 52 are also received in hemispherical openings in inner housing 24. Inner housing 24 is adapted to rotate about vertical axis B relative to fixed outer housing 22 by inclusion of appropriate mechanical structures such as tapered roller bearings 32 and 34.

In operation, rotation of shaft 20 is translated into rotation of inner housing 24 about vertical axis B, which also causes rotation of ball 26 about the longitudinal axis of rotor mast 12, thus causing rotor blades 14 to spin. Transmission assembly 10 accommodates limited tilting motion of rotor mast 12 about axis C to accomplish a change in the rotor blade attack angle.

In order to decouple the weight of rotor mast 12 and rotor blades 14 from ball 26, transmission assembly 10 may include plate 42 that is adapted to slide back and forth in the direction of arrow A relative to fixed housing 22. Joint 40 allows the angle of mast 12 relative to plate 42 to change. As plate 42 moves, the distance between ball 40 and ball center C changes. Accordingly, shaft 12 must be movable in its axial direction relative to ball 26. This can be accomplished by including a splined or keyed shaft that is received in an appropriate-shaped opening through ball 26.

The preferred embodiment of the invention is shown in more detail in FIGS. 2-6. Inner housing 124 comprises upper housing half 124a and lower housing half 124b, shown in detail in FIGS. 6A and 6B, respectively. Ball 126 has surface slots 151 and 153 in which are received ball bearings 150 and 152, respectively. Tapered roller bearings 132 and 134 allow rotation of inner housing 124 about fixed outer housing 122. Inner housing 124 is rotated about the vertical axis by translation of the rotary motion of helicopter engine drive shaft 120 using pinion gear 186 that drives an angled gear 184 that is coupled to inner housing 124. Drive shaft 120 is supported by bearing 188. In this simplified embodiment, shaft 112 is constrained from rotation relative to ball 126 by key 113. However, preferably shaft 112 is splined along the length that engages with ball 126 so that it is both rotatable by ball 126 and also slideable in and out of the ball. Upper and lower threaded caps 125 and 127, respectively, maintain housing halves 124a and 124b in position.

Figure 2:
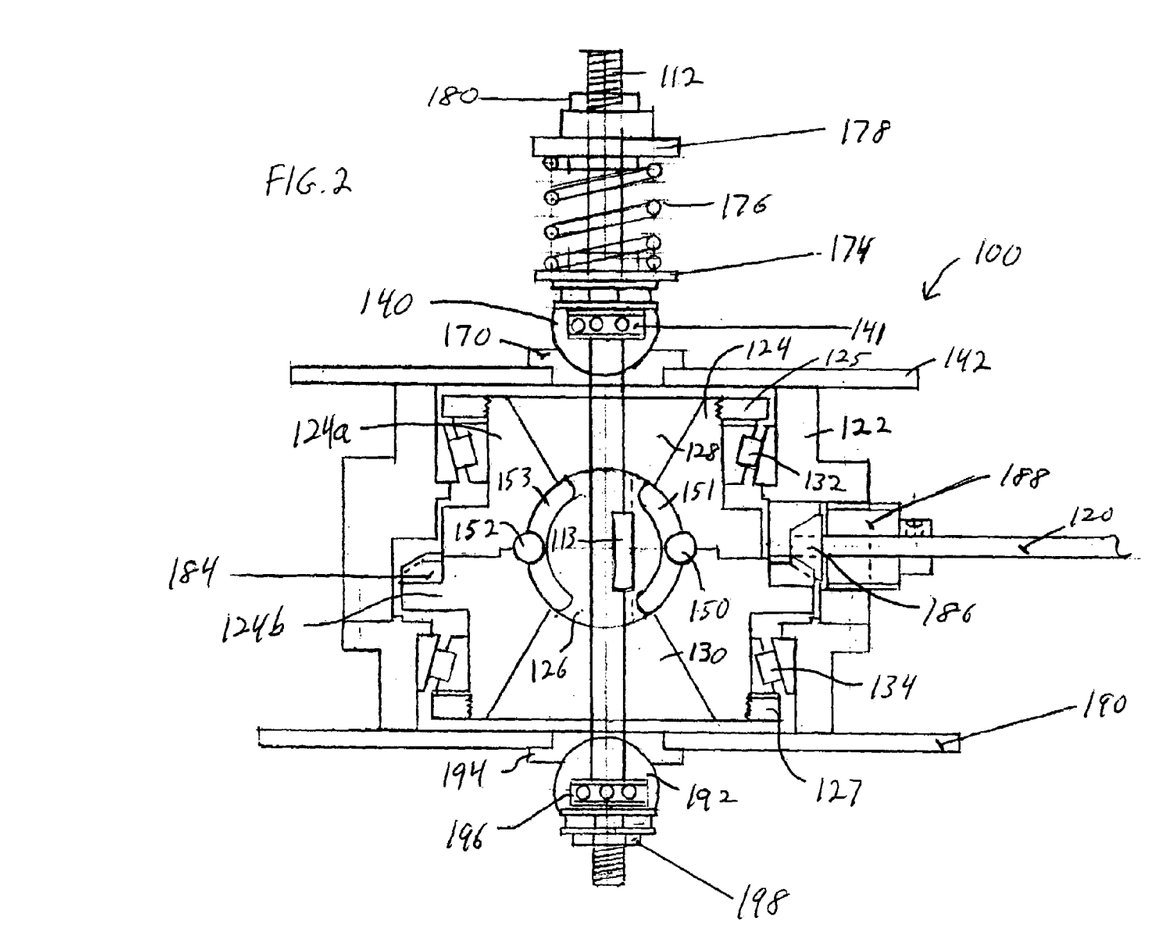
FIG. 2 is a more detailed drawing of the key components of the inventive helicopter rotor transmission assembly.
Figure 3A:
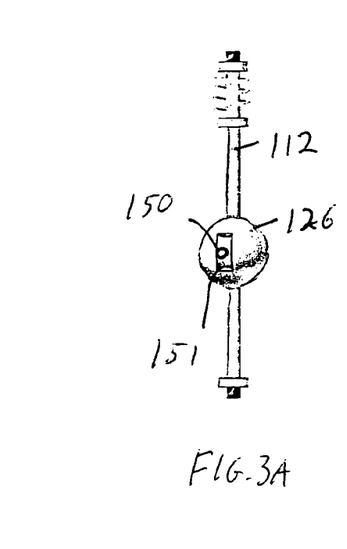
FIGS. 3A, 3B, 3C and 3D depict the preferred embodiment in various stages of construction.
Figure 3B:
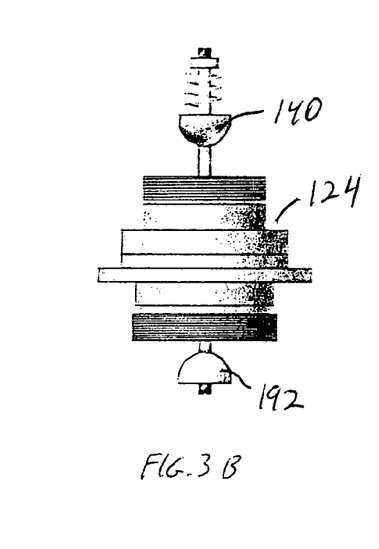
Figure 3C:
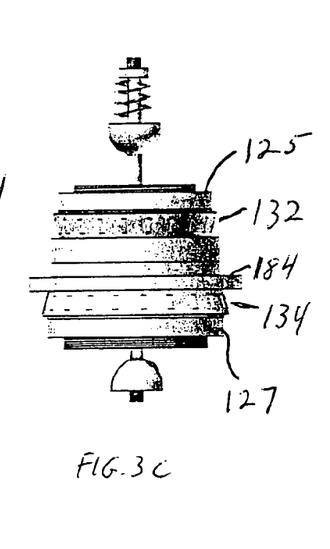
Figure 3D:
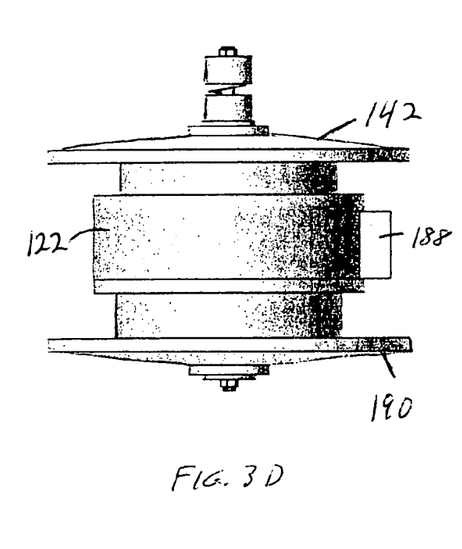
Figures 4A, 4B, 4C:
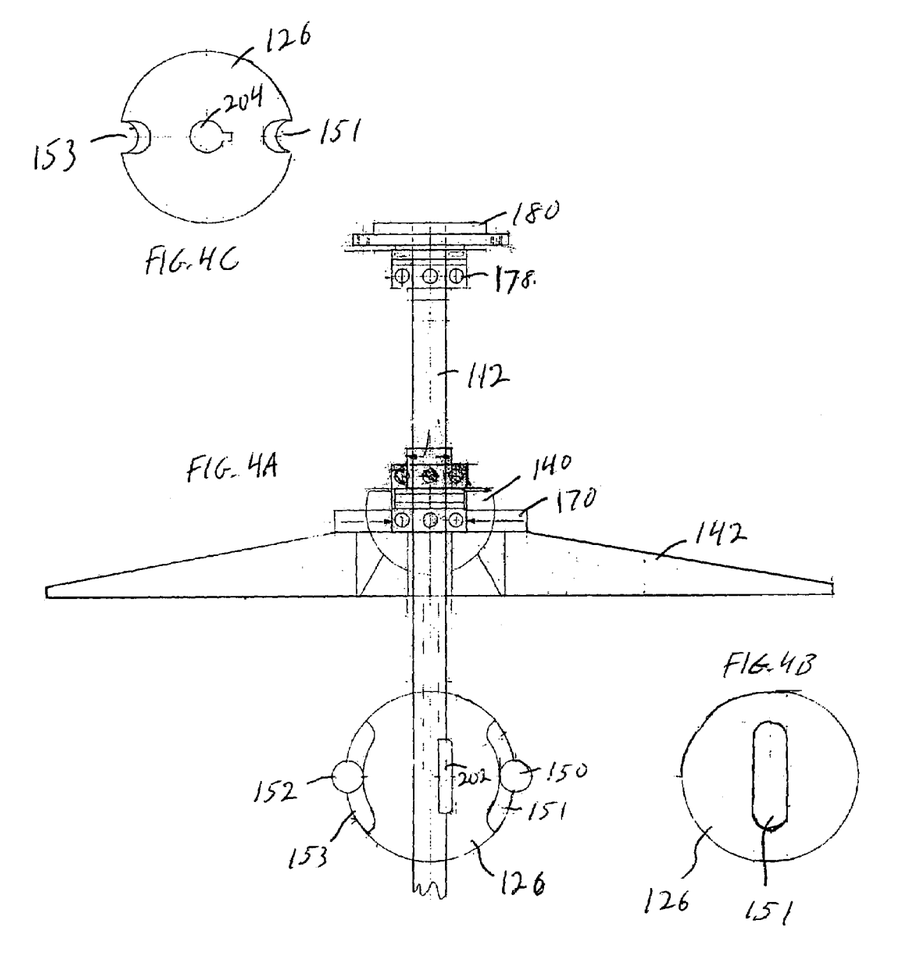

As described above, the weight of the rotor mast and rotor blades are decoupled from the ball by a support assembly that is engaged with the mast. In the preferred embodiment depicted herein, this support assembly comprises at least one and preferably two separate mechanical members through which the mast passes and on which or against which the mast rests. One such mechanical member is upper sliding plate 142 that slides relative to fixed housing 122. The rotor mast is coupled to the plate by partially spherical member 140 and bearing 141 in conjunction with partially spherical seat 170 that is coupled to plate 142. As mast 112 is pivoted about axis C, partially spherical member 140 rotates within seat 170. Also, mast 112 will slide in and out of ball 126.

Figure 5:
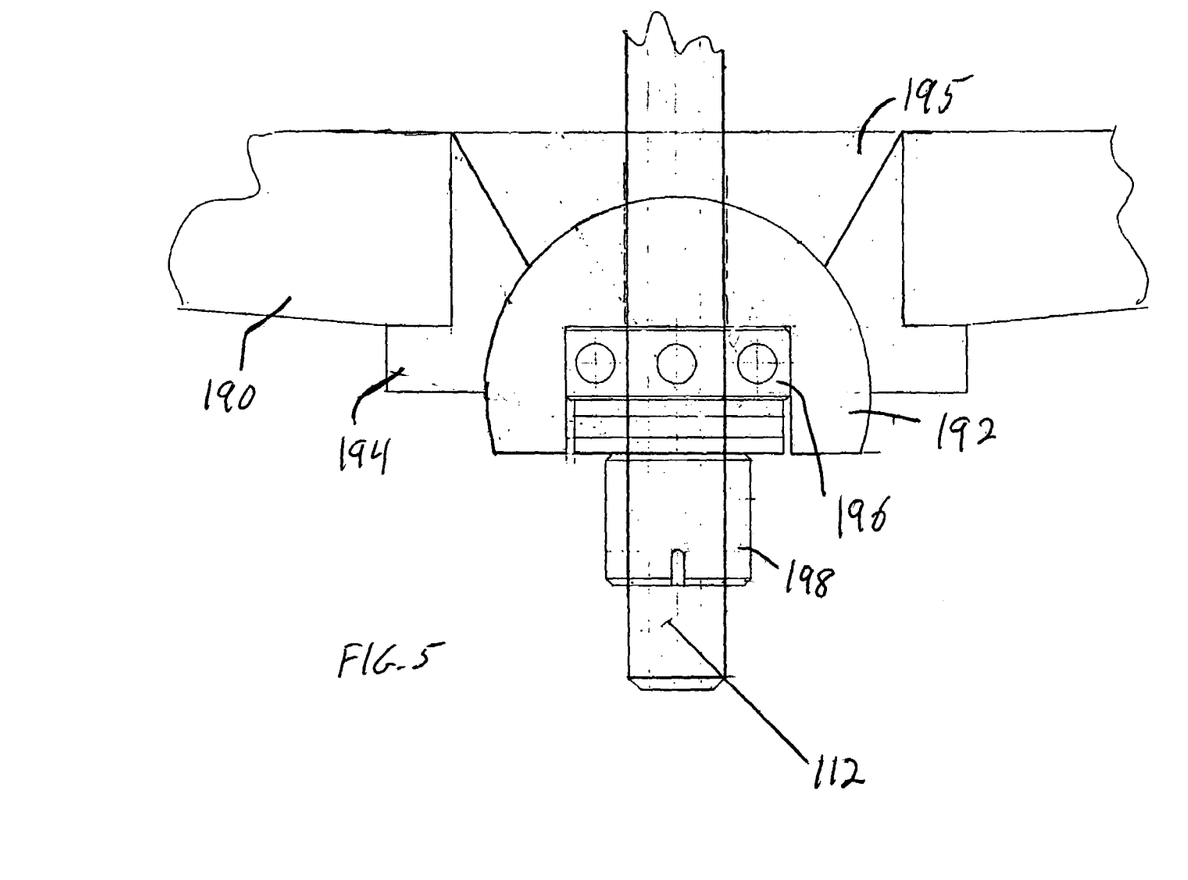
FIG. 5 is a view similar to that of FIG. 4A, but for the lower sliding plate of the preferred embodiment of the invention.

Additional support and structural integrity can be accomplished with second, lower support mechanical member 190 that also may be accomplished in a sliding plate in conjunction with partially spherical member 192, bearing 196, and seat 194. Nut, thrust bearing and washer assemblies 198 and 174 maintain bearings 196 and 141 on shaft 112. Rotor cap 178 and jam nut 180 provide proper compression of spring 176 that sits on spring guide 174. The purpose of the spring assembly is to maintain pressure on the upper and lower plate and maintain support of the propeller shaft.

Additional details of the construction of helicopter rotor transmission assembly 100 are shown in FIGS. 3A through 3D. Details that are particularly evident in these drawings show the assembly of the inner housing and the tapered roller bearings that provide for rotation of the inner housing relative to the outer housing.

FIGS. 4A through 4C show more detail of the ball 126 and the construction that provides for rotation of the ball about one axis so that mast 112 can tilt, as well as the shape of diametric opening 204 that accepts shaft 112 carrying key 202. Detail of slots 151 and 153 are also evident.

FIG. 5 shows in greater detail a portion of the lower support assembly of the preferred embodiment. FIG. 5 also shows in more detail the conical opening 195 in ball seat 194 that provides for tilting movement of the shaft relative to plate 190.

Figure 6A:
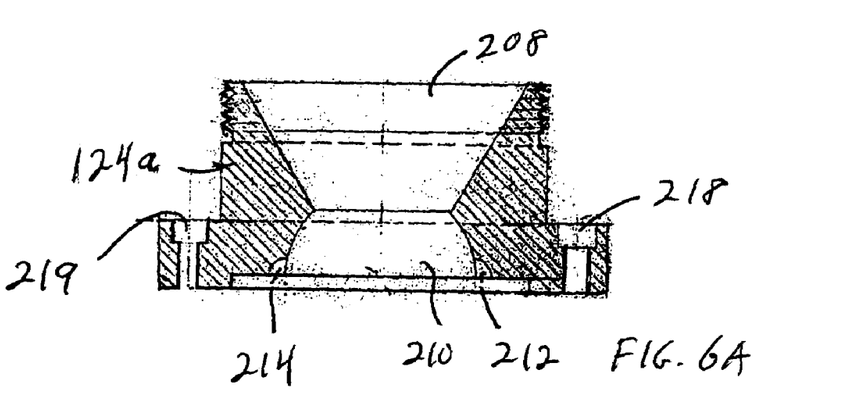
FIGS. 6A and 6B are cross sectional views of the upper and lower halves, respectively, of the inner housing for the preferred embodiment of the invention.
Figure 6B:
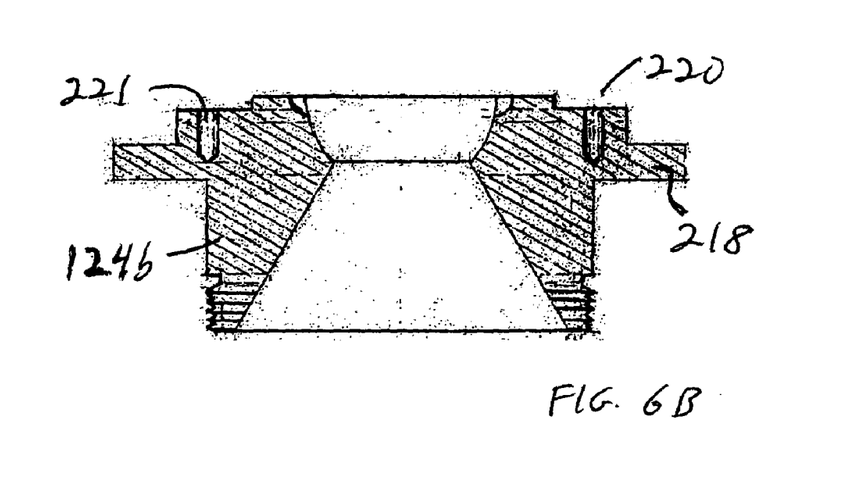

Inner housing halves 124a and 124b are shown in more detail in FIGS. 6A and 6B. The openings for receiving the ball, the ball bearings, and the shaft are identical in both halves. Frustoconical opening 208 provides for the 30 degree titling motion of the shaft. Hemispherical opening 210 accepts ball 126. Hemispherical openings 212 and 214 accept balls 150 and 152, respectively. Two inner housing halves 124a and 124b can be held together by cap screws received in upper openings 218 and lower threaded openings 220 and 221, respectively.

Figure 7:
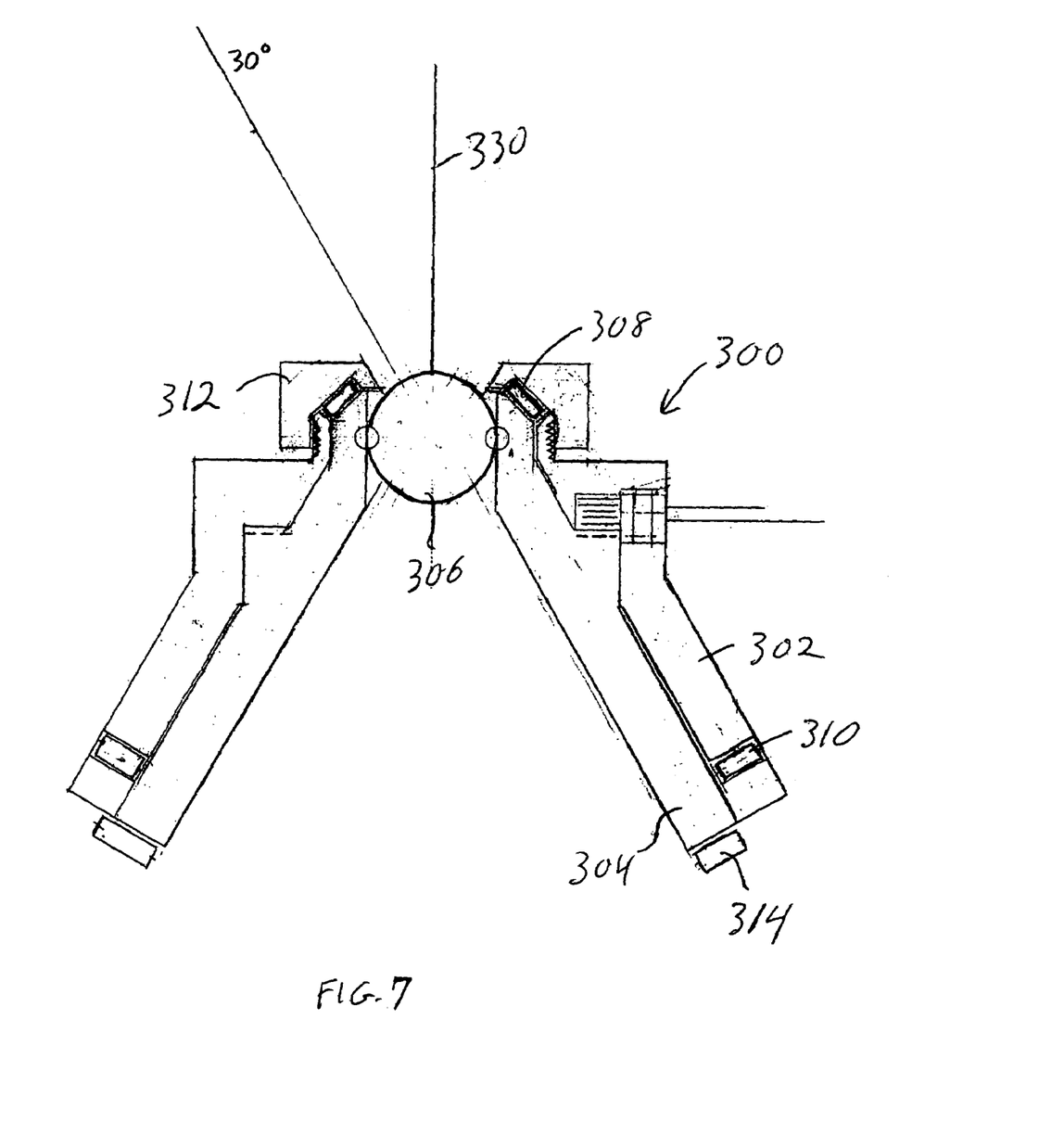
FIG. 7 is a schematic view of an alternative embodiment of the helicopter rotor transmission assembly of the invention.

An alternative embodiment illustrating possible alternative means of accomplishing the inventive transmission assembly is shown in FIG. 7. Inner housing 304 is rotatable about center line 330 relative to fixed outer housing 302 through bearings 308, 310 and 314. Cap 312 that is received on fixed housing 302 maintains bearing 308 in place. The construction of ball 306 and the ball bearings is the same as described above for the preferred embodiment.

Although specific features of the invention are shown in some drawings and not others, this is for convenience only as the various features may be combined in accordance with the invention.

Other embodiments will occur to those skilled in the art and are within the scope of the following claims.

What is claimed is:

1. A helicopter rotor transmission assembly for translating motion of a drive shaft driven by a helicopter engine into rotary motion of a helicopter rotor mast that defines a longitudinal axis and carries rotor blades, comprising:
   a fixed outer housing;
   an inner housing carried within the outer housing and adapted to rotate relative to the outer housing by the drive shaft;

one or more tapered roller bearings between the inner and outer housings; and a ball received in the inner housing so as to be constrained from rotation relative to the inner housing about the longitudinal axis, and tiltable about the two orthogonal axes;

wherein the ball is adapted to receive the rotor mast so that the mast can be driven to both spin and tilt.

2. The helicopter rotor transmission of claim 1, wherein the ball is adapted to tilt up to about plus or minus 30°.

3. The helicopter rotor transmission of claim 1, further comprising a support assembly engaged with the mast that decouples some of the weight of the mast and rotor blades from the ball.

4. The helicopter rotor transmission of claim 3, wherein the support assembly comprises at least one mechanical member through which the mast passes and on which the mast rests.

5. The helicopter rotor transmission of claim 4, wherein the support assembly further comprises a partially spherical member coupled to the mast and received in a ball seat coupled to the mechanical member.

6. The helicopter rotor transmission of claim 5, wherein the mechanical member is adapted to move side-to-side relative to the ball, to accommodate tilting of the mast.

7. The helicopter rotor transmission of claim 6, wherein the support assembly further comprises a second mechanical member, and wherein one mechanical member is located above the ball and the other is located below the ball.

8. The helicopter rotor transmission of claim 4, wherein the at least one mechanical member is supported by the helicopter structure.

9. The helicopter rotor transmission of claim 1, wherein the mast is coupled to the ball by a spline.

10. The helicopter rotor transmission of claim 1, wherein the ball defines a pair of diametrically opposed vertically-oriented slots in its surface, and the transmission further comprises two ball bearings located between the inner housing and the ball, one riding in each slot, to permit a tilting motion of the ball relative to the orthogonal axes.

11. The helicopter rotor transmission of claim 10, wherein the slots have a width that is essentially equal to the diameter of the ball bearings.

12. The helicopter rotor transmission of claim 1, further comprising a gear assembly in part coupled to the inner housing and in part coupled to the drive shaft, for translating drive shaft rotation to inner housing rotation.

13. A helicopter rotor transmission assembly for translating motion of a drive shaft driven by a helicopter engine into rotary motion of a helicopter rotor mast that defines a longitudinal axis and carries rotor blades, comprising:

a fixed outer housing;

an inner housing carried within the outer housing and adapted to rotate relative to the outer housing by the drive shaft; and a ball received in the inner housing so as to be constrained from rotation relative to the inner housing about the longitudinal axis, and tiltable about the two orthogonal axes, wherein the ball is adapted to receive the rotor mast so that the mast can be driven to both spin and tilt, and wherein the ball defines a pair of diametrically opposed vertically-oriented slots in its surface;

two ball bearings located between the inner housing and the ball, one riding in each slot, to permit a tilting motion of the ball relative to the orthogonal axes; and a support assembly engaged with the mast that decouples some of the weight of the mast and rotor blades from the ball, wherein the support assembly comprises at least one mechanical member through which the mast passes and on which the mast rests.

* * * * *